(12) United States Patent
Hinds

(10) Patent No.: US 7,530,776 B2
(45) Date of Patent: May 12, 2009

(54) HARVESTING MACHINE CHAIN PILER HAVING FORWARDLY CURVED PROFILE

(75) Inventor: Michael Lynn Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 72 days.

(21) Appl. No.: 11/677,074

(22) Filed: Feb. 21, 2007

(65) Prior Publication Data

US 2008/0199279 A1 Aug. 21, 2008

(51) Int. Cl.
*A24B 1/06* (2006.01)
*A01D 43/02* (2006.01)
*A01D 61/00* (2006.01)

(52) U.S. Cl. ............................ 414/132; 56/364; 56/16.6

(58) Field of Classification Search .................. 198/300, 198/307.1, 308.1, 309, 310, 311, 312, 698; 414/111, 132; 56/14.3, 14.6, 16.1, 16.4 B, 56/344, 345, 362, 364
See application file for complete search history.

(56) References Cited

U.S. PATENT DOCUMENTS

| | | | | |
|---|---|---|---|---|
| 117,204 A * | 7/1871 | Preston | ...................... | 414/442 |
| 1,545,865 A * | 7/1925 | Turek | ......................... | 414/360 |
| 2,674,380 A * | 4/1954 | Boudreaux | ................... | 414/132 |
| 4,225,034 A * | 9/1980 | Sarovich | ..................... | 198/607 |
| 4,609,318 A * | 9/1986 | Rodrigue et al. | ............ | 414/132 |
| 4,614,476 A * | 9/1986 | Mello Ribeiro Pinto | .... | 414/729 |
| 4,962,637 A * | 10/1990 | Giardina et al. | ............... | 56/344 |
| 2008/0089770 A1 * | 4/2008 | Hinds | ........................ | 414/680 |

* cited by examiner

*Primary Examiner*—Gregory W Adams

(57) ABSTRACT

A sugar cane chain piler includes a plurality of endless roller chains that are supported so as to define a forwardly curved profile. A head shaft supports a plurality of transversely spaced sprockets at top region of the piler which are aligned with a plurality of sprockets carried by a tail shaft located at a lower region of the piler. Each endless chain includes a plurality of conveyor tines that project outwardly from the chain. The head shaft is driven so that the tines engage cane stalks by rolling the stalks backwards into a pile being created as the loader vehicle carrying the piler is driven forward.

4 Claims, 5 Drawing Sheets

HARVESTING MACHINE CHAIN PILER HAVING FORWARDLY CURVED PROFILE

FIELD OF THE INVENTION

The present invention relates to a sugar cane piler, and more specifically relates to a chain piler.

BACKGROUND OF THE INVENTION

There are several types of pilers used in the sugar cane industry to produce a pile of cane that can then be placed into a transport unit by a sugar cane loader, which carries the piler and a boom supported grab assembly. The push piler is the cheapest and simplest of the pilers and comprises at least two forwardly facing, generally C-shaped structures which are spaced laterally from each other so as to define a piler pocket between them into which a loader grab tine may pass during loading cane stalks piled by the piler. A variation of a simple push piler of this type is a star or football piler and incorporates rotating elements along with the push piler. An example of this can be seen in U.S. Pat. No. 4,609,318. Another piler variation is known as a chain piler. An example of a chain piler is the Model SP2254 manufactured by Cameco. All of these pilers attempt to build a large bundle of cane stalks and to dislodge soil from the piled cane stalks by rolling the stalks backwards into the pile being formed.

The present invention concerns chain type pilers. The aforementioned Cameco Model SP 2254 chain piler consists of a frame shaped to define an upwardly and rearwardly extending inclined plane. A plurality of vertically disposed, endless roller chains are spaced across, and envelope, the frame, and are looped about respective first sprockets carried by a horizontal head shaft located at an upper region of the frame and respective second sprockets carried by a horizontal tail shaft located at a lower region of the frame. The chains are each equipped with a plurality of conveyor tines, with individual tines engaging the cane stalks at locations adjacent the tail shaft and carrying the cane stalks upwardly during forward movement of the piler until the individual tines move around the head shaft. At this point, the cane stalks are disengaged from the individual tines by forwardly curved deflector plates. As no direct force is being exerted by the chains on the cane stalks at this point, the deflector plates act similar to a push piler. The cane stalks tend to snow ball at the head shaft with little tumbling back onto the pile. If a sufficient amount of cane stalks pile up at the head shaft, cane stalks can top the forwardly curved deflector plates and bridge the piler pocket. This results in the pocket being obstructed, resulting in the rear grab tines having difficulty entering the pocket. In addition, the chain conveyor teeth become somewhat bound into the pile of cane stalks, which can result in the possible damage to the cane stalks and/or to the chain when the grab is closed about a load and lifted.

The problem to be addressed by the present invention is that of providing a chain piler that does not have the operating disadvantages attendant with the above-described prior art chain piler.

SUMMARY OF THE INVENTION

According to the present invention there is provided an improved chain piler structure.

An object of the invention is to provide a chain piler structure which operates so as to prevent cane stalks from accumulating so as to cause blockage of the piler pocket when the piler is operating to create a pile of cane stalks.

The noted object of the invention is accomplished by a chain piler having a frame structured so as to guide the various endless chains of the piler so that a forward run of the chain has an upper region which undergoes a forward component of movement whereby the engaged cane stalks are powered backward onto the forming pile, resulting in a larger and more uniform bundle of cane stalks. More specifically, the invention is accomplished by providing individual chain support structures which each support a chain so that its forward run has a forwardly curved profile.

The noted object and other objects of the invention will become apparent from a reading of the ensuing description together with the appended drawings.

DESCRIPTION OF THE PREFERRED EMBODIMENT

Figure 1:
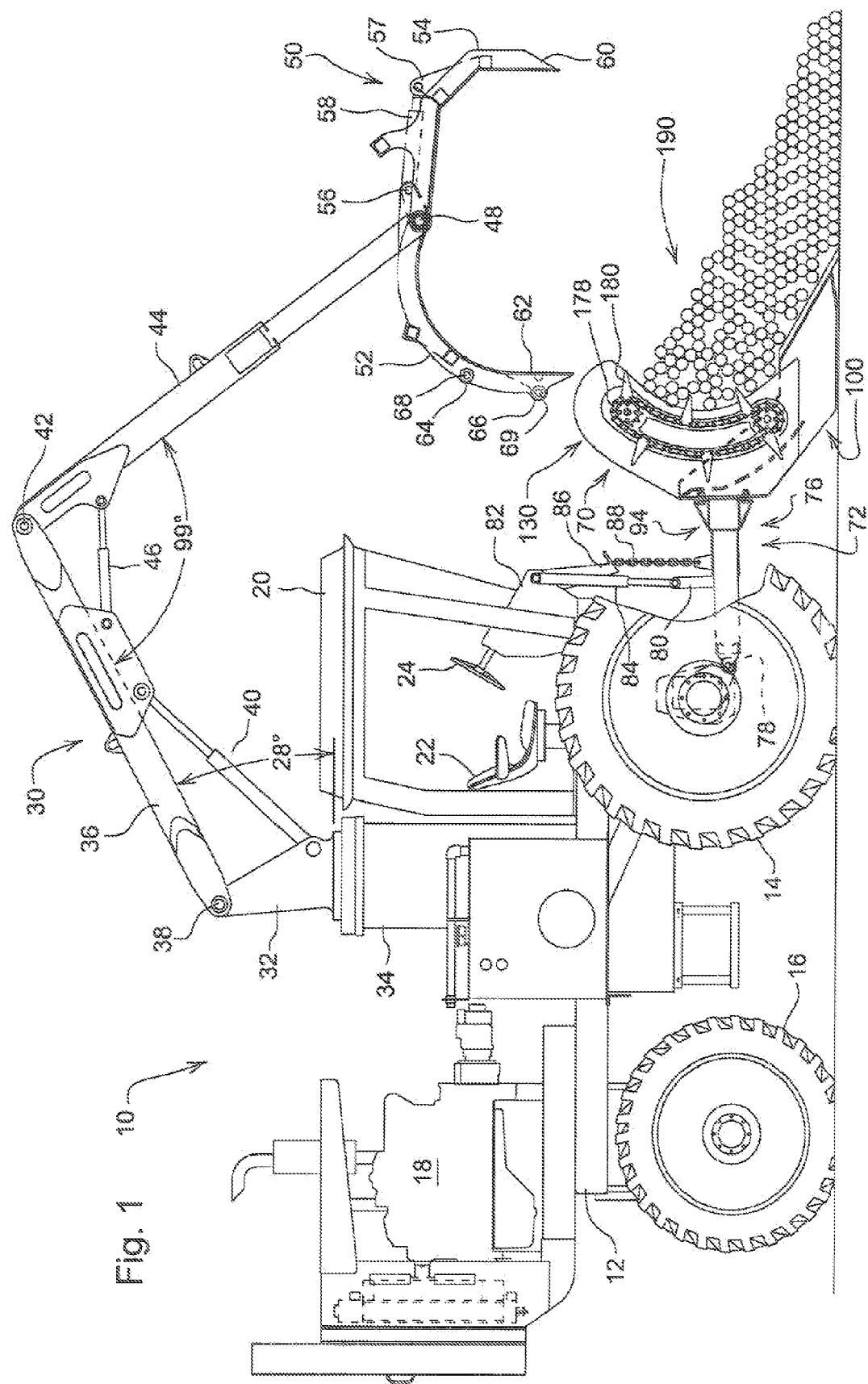
FIG. 1 is a right side view of a whole stalk sugar cane loader equipped with a grab assembly and with a chain piler assembly constructed in accordance with the present invention.
Figure 2:
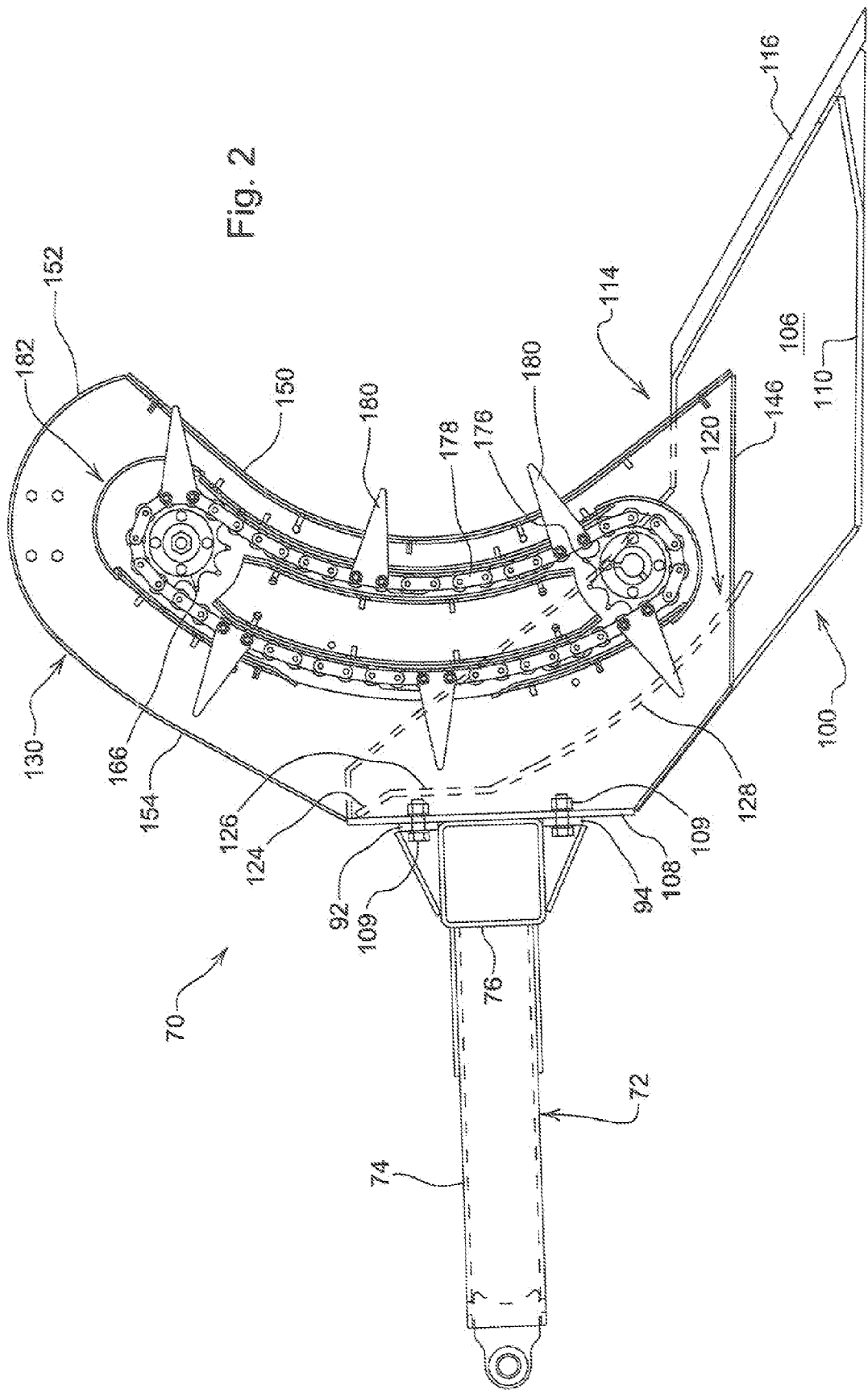
FIG. 2 is an enlarged right side view of the piler assembly shown in FIG. 1.

Referring now to FIG. 1, there is shown a sugar cane loader 10 including a loader boom arrangement 30 and a chain piler arrangement 70.

The sugar cane loader includes a main frame 12 supported on front and rear pairs of drive wheels 14 and 16, respectively, with the rear wheels 16 being steerable, in a well known manner (not shown). Power for driving the wheels and for operating the various hydraulic functions of the loader 10 is supplied by an internal combustion engine 18 supported on a rear region of the frame 12. Provided on a forward region of the frame 12 is an operator's cab 20 containing a seat 22 located within reach of various manually operated controls, of which only a steering wheel 24 is shown.

The loader boom arrangement 30 is mounted at a central region of the main frame 12, just to the rear of the cab 20. The loader boom arrangement 30 includes an upright mast 32 mounted to a pedestal 34 for being selectively rotated about a vertical axis, in a manner well known in the art. An inner boom 36 has a first end pivotally coupled, by a horizontal pivot arrangement 38, to an upper end of the mast 32 for being swung vertically by a first extensible and retractable hydraulic boom cylinder 40. The inner boom 36 has a second end pivotally coupled, by a horizontal pivot arrangement 42, to a first end of an outer boom 44, and a second extensible and retractable hydraulic boom cylinder 46 is coupled between the inner and outer booms 36 and 44 for pivoting the outer boom 44 about the pivot arrangement 42. Pivotally mounted to a second end of the outer boom 46, by a horizontal pivot arrangement 48, is a grab assembly 50 including, as viewed in the drawings, a curved rear grab tine 52 and an angled, opposing front grab tine 54. A first cylinder mounting bracket 56 is carried on the rear grab tine 52 adjacent the pivot arrangement 48. Mounted between the cylinder mounting bracket 56 and an second cylinder mounting bracket 57 projecting upwardly from the front grab tine 54 at a location, approximately halfway along its length, is an extensible and retractable hydraulic grab tine cylinder 58. The grab tine cylinder 58 is selectively operated so as to open the grab assembly 50, when the cylinder is retracted, as shown in FIG. 1, for example, and to close the grab assembly 50, when the cylinder 58 is extended. The front grab tine 54 includes opposite sides which terminate in a pair of spaced apart tine end sections 60 located for straddling a pair of tine end sections 62 of the rear grab tine 46 when the grab tine assembly 50 is completely closed.

Coupled to a back side of the rear grapple tine 52 in a region which constitutes approximately the lower third of a length dimension of the tine is an abutment assembly including a first roller 64 extending between an upper region of the tine end sections 62, as viewed in FIG. 1, and a lower pair of rollers 66, mounted one to a lower region of each tine end section 62. The first roller 64 is mounted for rotation about a shaft 68 having its opposite ends respectively fixed to the pair of end sections 62. The lower pair of rollers 66 are respectively mounted to a pair of shafts 69 that are respectively fixed to rear locations of the pair of end sections 62 of the rear grab tine 46. Thus, the first roller 64 is located to move in a path which is inward of separate paths followed by the lower rollers 66.

Referring now also to FIGS. 2-5, it can be seen that the piler arrangement 70 includes a frame assembly 72 including a pair of transversely spaced arms 74 joined at their forward ends to a cross beam 76 and having rear ends pivotally mounted to a lower front region of the main frame 12 for swinging vertically about a horizontal axis defined by respective horizontal pivot assemblies 78. A pair of upstanding brackets 80 are respectively joined to the pair of arms 74, and coupled between each bracket 80 and one of a pair of brackets 82 joined to the main frame 12, is an extensible and retractable, hydraulic piler lift cylinder 84. Formed at a lower end of each of the brackets 82 is a chain mounting bracket 86 containing a key hole shaped opening receiving a chain 88 having an end fixed to the cross beam 76 of the piler frame 72, with a selected link of the chain being placed in the smaller section of the key hole shaped opening, whereby the chain 88 serves as a down stop for preventing the piler arrangement 70 from being lowered to the extent that it digs into the soil.

The cross beam 76 of the frame assembly 72 includes a main beam member 90, of square cross section. Fixed to and projecting vertically upward from an upper front corner of the beam member 90 is an upper mounting strip 92 extending an entire length of the beam. Similarly, fixed to and projecting vertically downward from a lower front corner of the beam 90 is a lower mounting strip 94. Each of the mounting strips 92 and 94 contains a plurality of horizontally spaced mounting holes 96.

Figure 3:
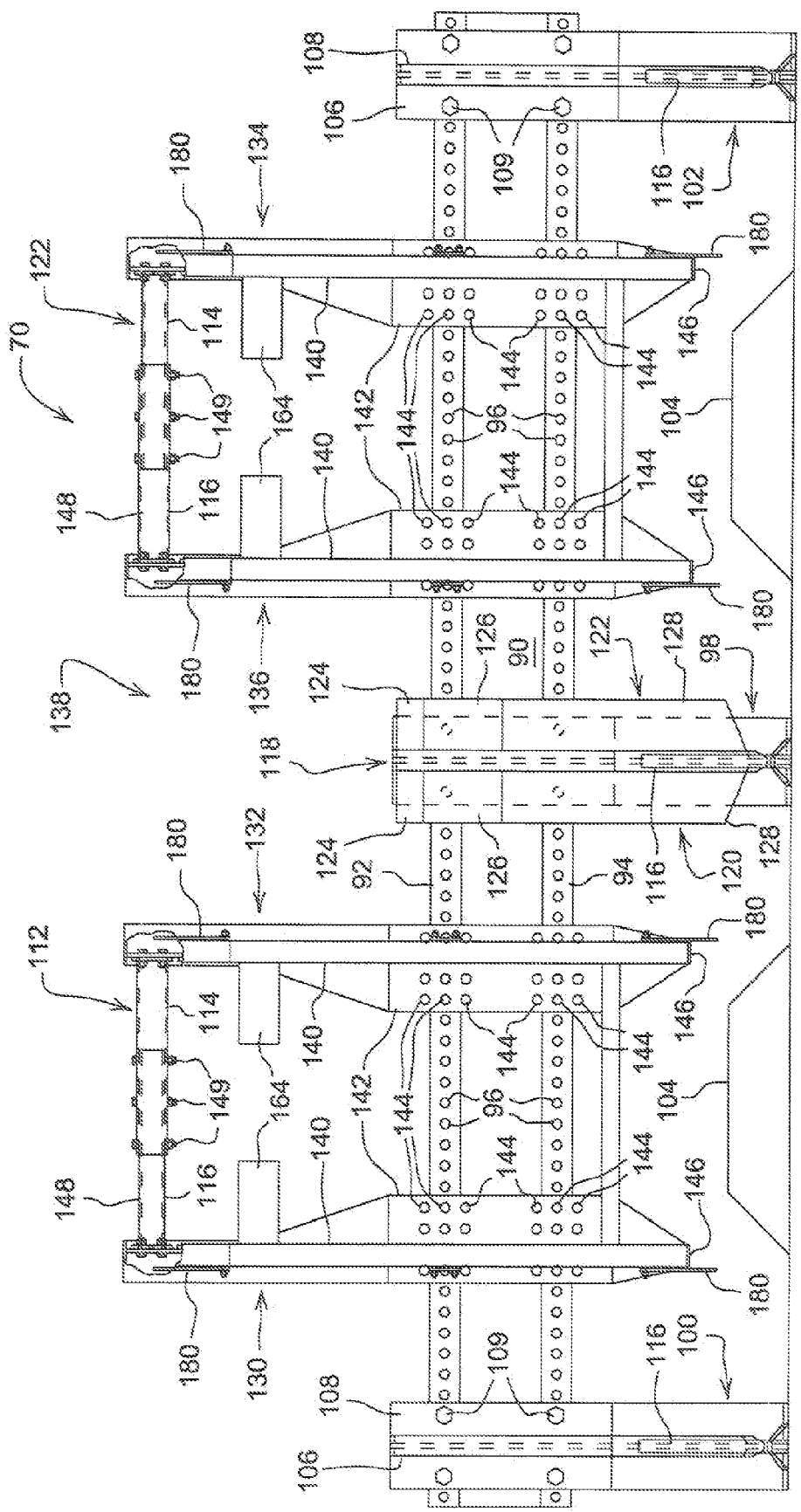
FIG. 3 is a front view of the piler assembly shown in FIG. 2.
Figure 4:
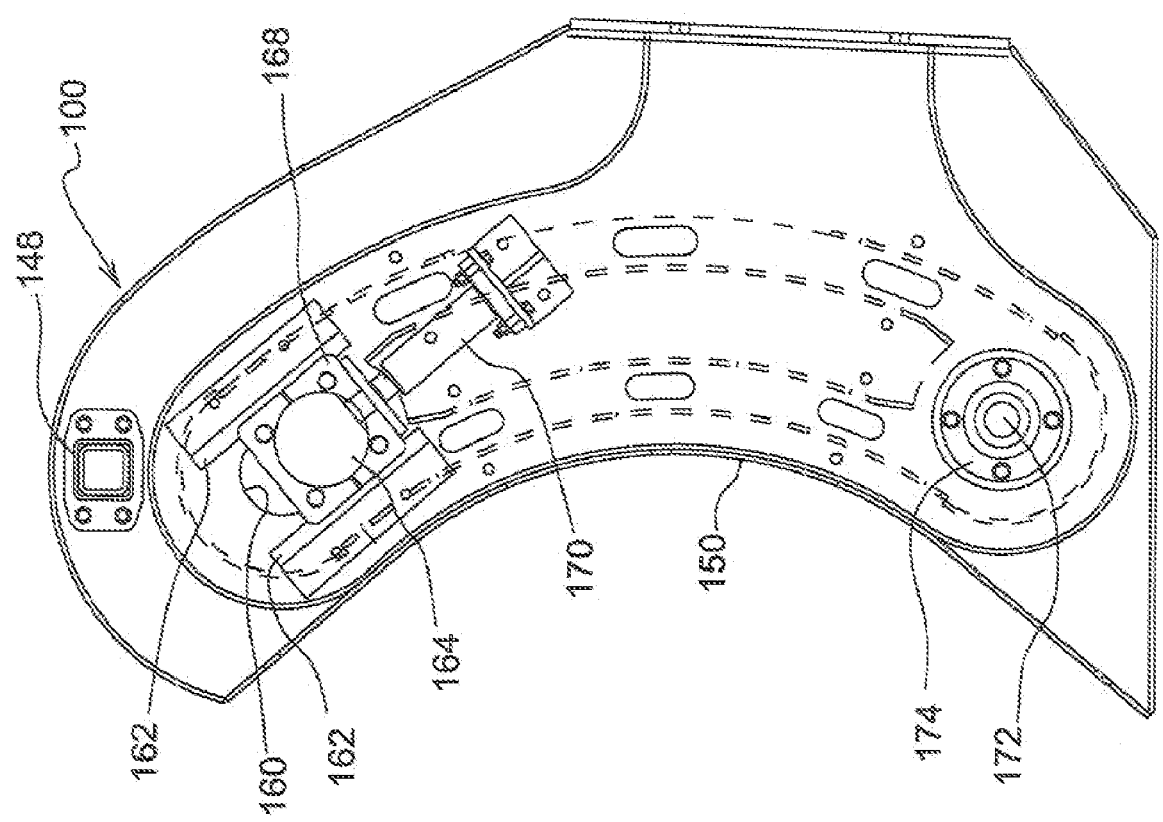
FIG. 4 is a left side view of one of the rightmost piler chain support member shown in FIG. 2, but omitting the piler chain.
Figure 5:
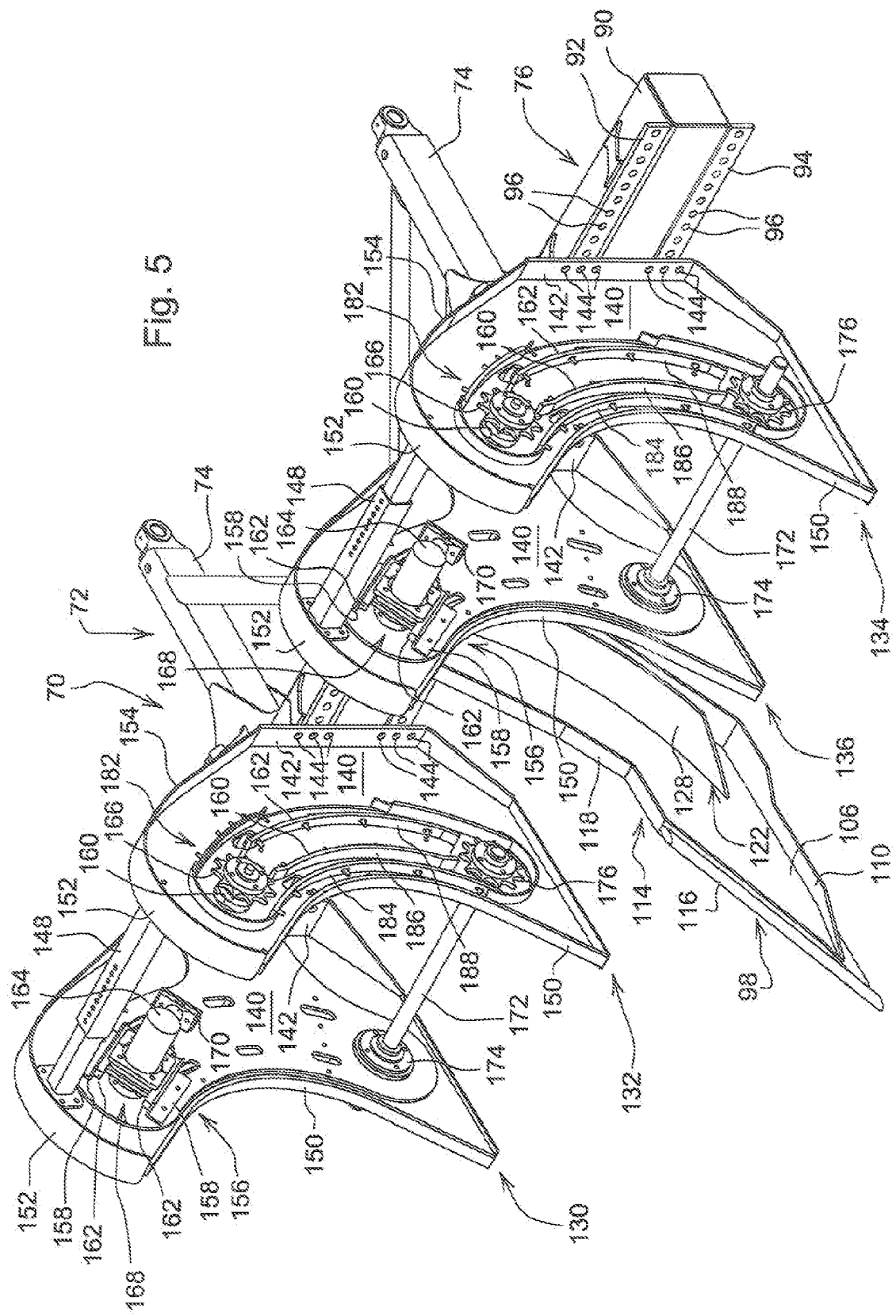
FIG. 5 is a left front perspective view of the piler assembly shown in FIG. 2, but omitting the piler chains and the right- and left-hand push lifters.

With reference especially to FIGS. 3 and 5, it can be seen that a middle cane stalk push lifter 98 is mounted to the upper and lower mounting strips 92 and 94 at a location centered between right- and left-hand cane stalk push lifters 100 and 102, respectively, mounted to opposite ends of the strips. The spacing between the middle push lifter 98 and the end cane stalk push lifters 100 and 102 is selected to be equal to the spacing between adjacent cane stalk rows 104, with the lifters 98, 100, 102 being adapted for operating centrally between adjacent cane rows 104. The push lifters 98, 100, 102 each comprise a central, vertical plate structure 106 having a stepped, upwardly and rearwardly inclined leading edge having an upper end joined to a rear edge defined by a vertical edge section to which is joined a downwardly and forwardly inclined edge section, which is, in turn, joined to a horizontal bottom edge. Welded to the vertical edge section is a vertical mounting plate 108 that extends beyond opposite sides of the plate structure 106 and has a top and a bottom respectively located at a height above the upper mounting strip 92, and at a height below the lower mounting strip 94. The mounting plate 108 of each push lifter 98, 100 and 102 contains upper and lower sets of holes which register with selected ones of the holes 98 provided in the mounting strips 92 and 94, with bolt fasteners 109 being provided at the aligned holes for securing the push lifters 98, 100 and 102 to cross beam 76. Welded to, and extending beyond opposite sides of the inclined rear edge section, and all but a small forward region of the horizontal bottom edge section of the respective plate structures 106 of the push lifters 98, 100, and 102 is a plate defining a skid shoe 110 having a forward end section that is bifurcated and inclined upwardly and forwardly at opposite sides of the plate structure 106. This inclined forward end section of the skid shoe 110 presents a surface which tends to prevent the push lifters from digging into the ground. The inclined, has a covering strip assembly 114 welded thereto. Welded to a lower inclined section of the covered leading edge is a wear resistant rod 116 having an upper end that terminates at a lower step of the covered leading edge.

Concerning only the middle push lifter 98, that portion of the strip assembly 114, not engaged by the rod 116, forms a guide rail 118, which includes upper and lower horizontal sections joined by an upwardly and rearwardly inclined middle section. Also relating only to the middle push lifter 98, are right- and left-hand guide rails 120 and 122 that are joined to opposite sides of the vertical plate structure 106 of the push lifter 98 so as to be behind the guide rail 118. The guide rails 120 and 122 each have a relatively short upper end section 124 which parallels the middle section of the guide rail 118, a relatively short middle section 126, which extends substantially parallel to the mounting plate 108, and a relatively long, downwardly and forwardly curved lower end section 128 having a lower end which terminates vertically below the lower horizontal section of the middle guide rail 118. The purpose of the guide rails 118, 120 and 122 is to properly position the grab assembly 50, as explained in further detail below, during the operation of grabbing a load of cane stalks that have been piled by the chain piler assembly 70.

The inclined rods 116 and the relatively narrow strip assemblies 114 at the forward edges of the push lifters 98, 100 and 102 operate during forward movement of the piler assembly 70 to lift sugar cane stalks, lying in windrows on the ground, upwardly into engagement with a plurality of chain piler units including a right-hand pair of outer and inner chain piler units 130 and 132, and a left-hand pair of outer and inner chain piler units 134 and 136, with the inner and outer units being mirror images of each other. The right-hand pair of chain piler units 130 and 132 are mounted to the upper and lower mounting strips 92 and 94 so as to be centered between the middle and right-hand push lifter units 98 and 100, and are spaced from each other so as to be centered above a respective cane row 104. Similarly, the left-hand pair of chain piler units 134 and 136 are mounted to the mounting strips 92 and 94 so as to be centered between the middle and left-hand push lifters 98 and 102, and are spaced from each other so as to be centered above another one of the cane rows 104. A piler pocket 138 (FIG. 3) is defined between the inner chain piler units 132 and 136 into which the rear loader grab tine 52 may be inserted for picking up a pile of cane produced by the chain piler assembly 70, as is described in further detail below.

Each of the chain piler units 130, 132, 134, and 136 includes a vertical chain support structure 140 having a vertical rear edge to which is welded a vertical mounting plate 142 containing upper and lower sets of mounting holes 144 that are respectively brought into register with selected ones of the mounting holes 96 provided in the upper and lower mounting strips 92 and 94. Bolt fasteners (not shown, but like the fasteners 109) are inserted through the registered holes so as to secure the chain piler units to the cross beam 76. The chain support structures 140 each include a horizontal bottom edge 146 which terminates at a height spaced above the ground, which is slightly less that the height at which upper ends of the rods 116 of the push lifters 98, 100 and 102 terminate.

Extending between, and having opposite ends secured to an upper region of the chain support structures 140 of each of the right-hand pair of piler chain units 130 and 132 is a telescopic cross brace 148 which is fixed at an adjusted length by a plurality of fasteners 149 inserted through aligned holes provided in the telescoping sections of the brace 148. A similar brace 148 is provided between an upper region of each of the chain support structures 140 of the left-hand pair of piler chain units 134 and 136. The chain support structures 140 each include a forwardly opening, generally C-shaped from surface 150 which extends between a forward end of the bottom edge 146 and a front of a curved top edge 152, the latter having a rear end which terminates at, and is joined to an upper end of, a rear edge 154 which inclines downwardly to an upper end of the vertical mounting plate 142.

Fixed to an upper region of the inner surface of the chain support structure 140 of each of the piler chain units 130 and 134, and to an upper region of the outer surface of the chain support structure 140 of each of the piler chain units 132 and 136, are respective head shaft guide assemblies 156, which each include a pair of angle members 158 arranged parallel to each other and having first sides respectively fixed at opposite sides of an upwardly and forwardly inclined oval opening 160. Vertical sides of the angle members 158 each have a guide bar 162 fixed along its length. A hydraulic motor 164 includes an output shaft (not visible) defining a head shaft which projects through the opening 160 and mounted to the head shaft, so as to be on an opposite side of the chain support structure 140 from the motor 164, is a chain sprocket 166. A guide plate assembly 168 is fixed to the motor 164 and is mounted for sliding along the guide bars 162. An extensible and retractable hydraulic actuator 170 has a rod end coupled to a bracket carried by the motor 164 and a cylinder coupled to a bracket fixed to the chain support structure 140, with the actuator 170 being operable for selectively effecting up or down movement of the motor 164, and, hence, the head shaft, within the oval opening 160, for a purpose explained below.

Located in a lower region of each of the chain support structures 140 of the chain piler units 130, 132, 134 and 136 so as to be substantially vertically below the oval openings 160, are respective horizontally aligned openings. Received in the openings provided in the right-hand pair of chain piler units 130 and 132 is a firs shaft 172, and received in the openings provided in the left-hand pair of chain piler units 134 and 136 is a second shaft 172. The shafts 172 are supported in bearing assemblies 174 fixed to confronting surfaces of the support structures 140 of the piler units 130 and 132, and in confronting surfaces of the support structures 140 of the piler units 134 and 136. Mounted to opposite ends of the shafts 172 are respective chain sprockets 176. An endless roller chain 178 (see FIG. 2) is trained about each set of sprockets 166 and 176, and fixed to an outer side of each of the chains 178, relative to the support structure 140, by link pins passing through the chain rollers, is a plurality of triangular, flat cane conveyor teeth 180. The path traveled by the chain 178 is determined by a chain guide arrangement 182 including an outer, generally kidney-shaped guide member 184 having upper and lower ends extending about the sprockets 166 and 176. A forward side of the guide member 184 is spaced behind and extends substantially parallel to the front edge 150 of the chain support structure 140. The height of the guide member 184 from the chain support structure 140 is such that the conveyor teeth 180 project beyond the guide member 184, with the teeth 180 being sufficiently long that as they travel adjacent a forward side of the guide member 184 they project forwardly beyond the front edge 150 of the chain support structure 140. Each chain guide arrangement 182 further includes front and rear guide members 186 and 188 which extend between the sprockets 166 and 177 and are disposed substantially parallel to each other and to a forward side of the outer guide member 184.

While the forwardly curved leading edge of the support structures 140 and the corresponding shape of the chain guide assembly are the preferred shapes, other shapes would also result in beneficial operation. For example, the support structures 140 could have a leading edge that defines a forwardly opening V with the chain associated with the each support structure being guided so that its forward run parallels the upper side of the V so that during operation the conveyor teeth would have a forward component of movement that would cause the cane stalks to be rolled forward onto the pile being formed.

The operation of the chain piler assembly 70 is briefly as follows. Once the sugar cane loader 10 is driven to a sugar cane field where the cane has been cut and windrowed so as to extend generally crosswise to the cane rows 104. With the size of loader 10 and chain piler assembly 70 being that shown in the drawings, the loader 10 is oriented so that the middle push lifter 98 is centered between a first pair of adjacent rows 104, while the right- and left-hand push lifters 100 and 102, respectively, are each centered between a different one of the first pair of rows 104 and the next adjacent row 104. The chain piler assembly 70 is lowered until the skid shoes 110 come into ground contact. The motors 164 are then actuated to cause the chains 178 to be driven counterclockwise, as viewed in FIG. 2. The loader 10 is then driven forward with the push lifters 98, 100, and 102 causing the windrowed cane to be elevated into contact with the curved front edges 150 of the chain support structures 140 of the chain piler units 130, 132, 134, and 136. Once the cane stalks are elevated to the extent that they are within reach of the conveyor teeth 180, the stalks are carried upward, then rolled forward onto the building pile of cane stalks, as shown at 190 in FIG. 1. This action of the piler chains 178 is important in that it results in more soil being dislodged from the cane stalks than is possible with a conventional push piler and avoids the aforementioned disadvantages of the prior art chain piler wherein the chains are disposed on a rearward incline and have no forward component of movement.

Once a cane stalk pile 190 is formed, it may be loaded onto an adjacent container of a transport trailer, or the like, by manipulating the grab assembly 50 so that, with the grab tines 52 and 54 opened, the rear grab tine 52 is lowered into the piler pocket 138 (see FIG. 3). The grab tines 52 and 54 and then closed about the piled cane, with the encircled load of cane then being lifted and deposited into the transport container. The piling and loading functions are then repeated.

Having described the preferred embodiment, it will become apparent that various modifications can be made without departing from the scope of the invention as defined in the accompanying claims.

The invention claimed is:

1. A sugar cane chain piler assembly, comprising: a piler frame supporting at least first and second upright chain piler units respectively including first and second chain support structures that are spaced transversely from each other so as to define a piler pocket between them; said support structures having respective front surfaces, which as viewed in profile from a right-hand side of said piler assembly are curved from top to bottom so as to be generally C-shaped and include an upper portion which extends upwardly and forwardly; first and second horizontal, transversely extending head shafts being respectively mounted to upper regions of said first and second chain support structures; first and second horizontal, transversely extending tail shafts being respectively mounted to lower regions of said first and second frame sections; at least a first pair of sprockets being mounted, one each to each of said first head shaft and said first tail shaft so as to be in alignment with each other, and at least a second pair of sprockets being mounted, one each to each of said second head shaft and said second tail shaft so as to be in alignment with each other; first and second endless roller chains being respectively trained about said first and second pairs of sprockets; each chain supporting a plurality of outwardly projecting conveyor teeth; a drive assembly being coupled to said first and second head shafts; and first and second chain guide assemblies respectively being carried by said first and second chain support structures and respectively associated with said first and second endless chains such that forward runs of said first and second endless chains are located substantially parallel to, and located behind, said front surfaces of said chain support structures, with said conveyor teeth projecting forwardly of an adjacent one of said surfaces, whereby said conveyor teeth act together with said upper portions of said front surfaces so as to cause cane stalks to be rolled forwardly onto a pile of cane being formed during forward movement of said piler assembly along a windrow of wholestalk sugar cane.

2. The sugar cane piler assembly, as defined in claim 1, wherein said drive assemblies include first and second motors respectively having first and second output shafts which are said first and second head shafts.

3. The sugar cane piler assembly, as defined in claim 2, wherein said first and second motors are respectively mounted for movement toward and away from said first and second tail shafts for adjusting the tension in said first and second chains; and first and second extensible and retractable actuators respectively being coupled to said first and second motors and to said first and second chain support structures for respectively adjusting the tension in said first and second chains.

4. The sugar cane piler assembly, as defined in claim 1, wherein said first and second chain piler units are elevated above a ground surface when the piler assembly is in a working position; and a push lifter being mounted to said frame in a location between said first and second chain piler units and including a forward, upwardly and rearwardly inclined lifting edge disposed for elevating cane stalks from the ground surface and into a position wherein the stalks may be engaged by said front surfaces and said conveyor teeth, during forward movement of said cane piler assembly when said first and second chains are driven.

* * * * *